W. K. FULLER.
Stump Extractor.
No. 201,514. Patented March 19, 1878.
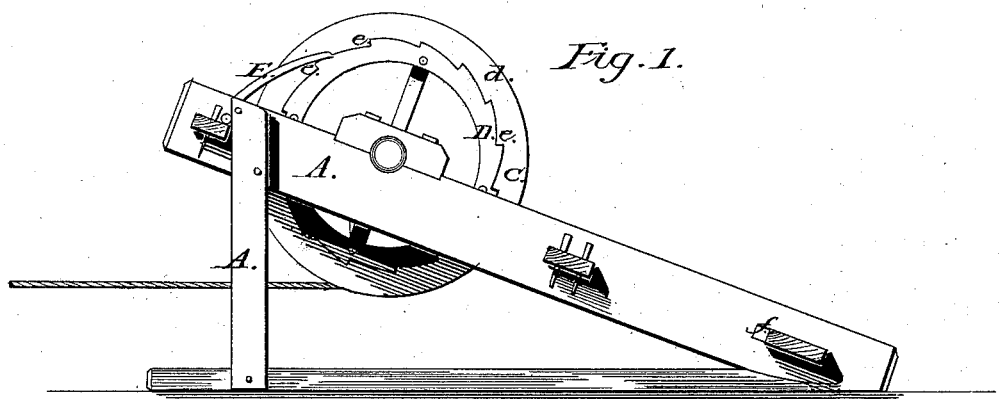
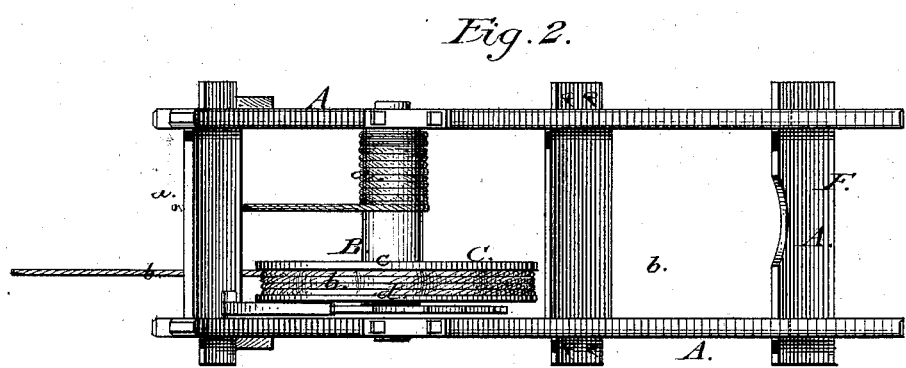
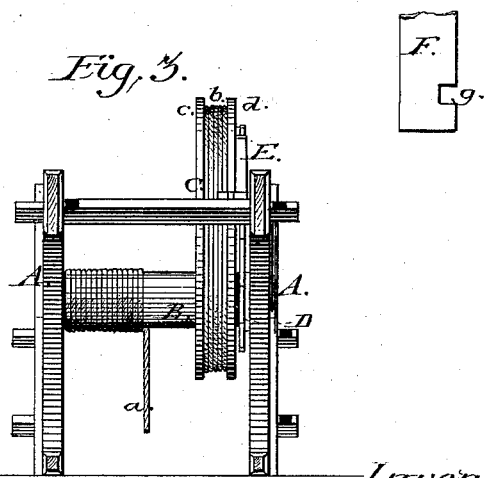

UNITED STATES PATENT OFFICE.

WILLISTON K. FULLER, OF MODENA, ILLINOIS.

IMPROVEMENT IN STUMP-EXTRACTORS.

Specification forming part of Letters Patent No. 201,514, dated March 19, 1878; application filed November 28, 1877.

*To all whom it may concern:*

Be it known that I, WILLISTON K. FULLER, of Modena, in the county of Stark and State of Illinois, have invented certain new and useful Improvements in Stump Extractors and Grubbers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to an improved apparatus for extracting or grubbing out trees and stumps in clearing land for cultivation; and it consists of an inclined frame-work provided at one end with slots to receive a sliding block for adjusting the apparatus to a tree or stump, to hold the same in position while in use, and at the other end with a flanged drum secured to one side of a windlass having its bearings in the frame, said drum and windlass being provided with suitable ropes or cables which exert their force when in use, all as will be hereinafter more fully described, and pointed out in the claim.

Referring to the drawings, Figure 1 represents a front elevation of my improved apparatus; Fig. 2, a rear view thereof, and Fig. 3 a top-plan view of the same.

Similar letters of reference occurring on the several figures indicate corresponding parts.

In the drawings, A denotes the frame of my apparatus, constructed in shape like an inclined plane, to the upper part of which is journaled, in suitable bearings, the windlass B, which carries at one side the flanged drum C.

A rope or cable, $a$, is wound upon the windlass B, and a rope or cable, $b$, upon the drum C, between the flanges $c$ and $d$, said ropes being so arranged that the strain of each will be at right angles to each other, thereby serving to exert a great leverage force upon the obstacle to be lifted.

To one side of the drum C, next the frame, is attached a metallic circular piece, D, which is provided at regular intervals with teeth or notches $e$, into which is adapted to catch the point of the pawl E, which is pivoted or hinged to the upper cross-timber of the frame A.

The lower part of the frame is provided with an open end between the two side timbers, each of which has a slot, $f$, cut therein, and adapted to receive a cross-bar, F, which is also provided with notches $g$ cut at right angles to the notches $f$, so as to interlock the said bar therein, and at the same time to allow of its lateral adjustment.

The construction of my invention being as already described, it will be observed that in the operation of the same the apparatus is held in the desired position by arranging the open end of the same around a tree, and then setting in place the cross-bar F, which securely locks the frame around the tree. Suitable horse or steam power is then applied to the rope or cable $b$ upon the drum C, the rope or cable $a$ upon the windlass B being first attached to the tree to be uprooted or lifted, and as the force upon the cable $b$ revolves the drum C, it will be found that the rope $a$ tightens and draws up the tree by the roots.

The advantages of my invention will be clearly apparent, inasmuch as it combines in its construction and operation a high degree of simplicity, durability, and efficiency, with a ready adaptation to the purpose intended.

Having thus described my invention, what I claim as new and useful is—

In a machine for extracting trees or stumps, the frame A, constructed with an open end, having slots $f$ adapted to receive the slotted ends of the cross-bar F, and provided with the windlass B and flanged drum C, having the circular ratchet D and pawl E, the several parts being adapted for operation substantially as shown and described.

In testimony that I claim the foregoing as my own invention I affix my signature in presence of two witnesses.

WILLISTON K. FULLER.

Witnesses:
    DANIEL WOLGERMOOR,
    JOE NOWLAN.